(12) United States Patent
DeMerchant (10) Patent No.: US 9,344,766 B2
(45) Date of Patent: May 17, 2016

(54) USER ASSIGNED CHANNEL NUMBERING FOR CONTENT FROM MULTIPLE INPUT SOURCE TYPES

(71) Applicant: SONY CORPORATION, Tokyo (JP)

(72) Inventor: Marvin DeMerchant, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/259,969

(22) Filed: Apr. 23, 2014

(65) Prior Publication Data

US 2015/0312636 A1    Oct. 29, 2015

(51) Int. Cl.

| | |
|---|---|
| *H04N 5/445* | (2011.01) |
| *H04N 5/50* | (2006.01) |
| *H04N 5/44* | (2011.01) |
| *H04N 21/482* | (2011.01) |
| *H04N 21/422* | (2011.01) |
| *H04N 21/462* | (2011.01) |
| *H04N 21/47* | (2011.01) |
| *H04N 21/434* | (2011.01) |
| *H04N 21/438* | (2011.01) |
| *H04N 21/472* | (2011.01) |
| *H04N 21/435* | (2011.01) |
| *H04N 7/088* | (2006.01) |
| *H04N 21/475* | (2011.01) |
| *H04N 21/485* | (2011.01) |
| *G06F 3/00* | (2006.01) |
| *G06F 13/00* | (2006.01) |

(52) U.S. Cl.
CPC ........... *H04N 21/482* (2013.01); *H04N 5/4403* (2013.01); *H04N 5/44543* (2013.01); *H04N 5/50* (2013.01); *H04N 7/0884* (2013.01); *H04N 7/0887* (2013.01); *H04N 21/42204* (2013.01); *H04N 21/435* (2013.01); *H04N 21/4345* (2013.01); *H04N 21/4383* (2013.01); *H04N 21/4622* (2013.01); *H04N 21/47* (2013.01); *H04N 21/4755* (2013.01); *H04N 21/47205* (2013.01); *H04N 21/485* (2013.01); *H04N 21/4821* (2013.01); *H04N 21/4823* (2013.01); *H04N 21/4828* (2013.01)

(58) Field of Classification Search
CPC ............ H04N 21/4622; H04N 21/482; H04N 5/4401; H04N 5/50; H04N 5/44543; H04N 7/0887; H04N 21/42204; H04N 21/435; H04N 21/4345; H04N 21/4383; H04N 21/47; H04N 21/4823; H04N 7/0884; H04N 21/4821; H04N 21/4828; H04N 5/4403; H04N 21/485; H04N 21/4755; H04N 21/47205
USPC .............. 725/47, 38, 52, 56, 57, 59; 348/731, 348/732, 734
See application file for complete search history.

(56) References Cited

U.S. PATENT DOCUMENTS

| | | |
|---|---|---|
| 3,933,121 A | 1/1976 | Otsuki |
| 3,947,773 A | 3/1976 | Christensen |
| 3,984,828 A | 10/1976 | Beyers, Jr. |
| 4,110,694 A | 8/1978 | Wilhelm |
| 4,158,815 A | 6/1979 | Wine |

(Continued)

*Primary Examiner* — Hoang-Vu A Nguyen-Ba
(74) *Attorney, Agent, or Firm* — John L. Rogitz (57) ABSTRACT

A user is enabled to assign channel numbers to his favorite content, including TV stations, Internet sites, local applications, and recorded content. In this way, the user's favorite content sources are grouped so that they can be quickly accessed using channel up/down commands regardless of, e.g., the actual channel number of a favorite TV station.

20 Claims, 3 Drawing Sheets

(56) References Cited

U.S. PATENT DOCUMENTS

| | | |
|---|---|---|
| 4,187,469 A | 2/1980 | Tanaka |
| 4,279,035 A | 7/1981 | Skerlos |
| 4,281,414 A | 7/1981 | Fushimi |
| 4,419,728 A | 12/1983 | Larson |
| 4,525,740 A | 6/1985 | Borg |
| 4,724,519 A | 2/1988 | Barlow et al. |
| 5,315,392 A * | 5/1994 | Ishikawa et al. ............... 725/56 |
| 5,682,382 A | 10/1997 | Shepard |
| 5,845,062 A | 12/1998 | Branton, Jr. et al. |
| 5,949,476 A | 9/1999 | Pocock et al. |
| 6,037,877 A | 3/2000 | Matthews |
| 6,252,635 B1 | 6/2001 | Vandeputte |
| 6,674,460 B1 | 1/2004 | Pocock et al. |
| 6,803,874 B1 * | 10/2004 | Weber ........................... 341/176 |
| 7,002,985 B2 | 2/2006 | Dertz et al. |
| 7,035,250 B2 | 4/2006 | Lai et al. |
| 7,057,673 B1 * | 6/2006 | Weber ........................... 348/734 |
| 7,170,546 B1 | 1/2007 | Pocock |
| 7,440,436 B2 | 10/2008 | Cheng et al. |
| 7,697,077 B2 | 4/2010 | Van Horck et al. |
| 7,890,983 B2 | 2/2011 | Chen et al. |
| 8,498,392 B2 | 7/2013 | Wishart |
| 8,539,145 B1 | 9/2013 | Warnes et al. |
| 2001/0039584 A1 * | 11/2001 | Nobakht et al. ............. 709/227 |
| 2002/0093930 A1 | 7/2002 | Dertz et al. |
| 2002/0140871 A1 * | 10/2002 | Piotrowski et al. ........... 348/731 |
| 2003/0213001 A1 * | 11/2003 | Yuen et al. .................... 725/136 |
| 2003/0227904 A1 | 12/2003 | Rabinovich et al. |
| 2005/0002409 A1 | 1/2005 | Lai et al. |
| 2005/0180356 A1 | 8/2005 | Gillies et al. |
| 2006/0092910 A1 | 5/2006 | Dertz et al. |
| 2006/0194540 A1 | 8/2006 | Hunzinger et al. |
| 2006/0217062 A1 | 9/2006 | Saffre et al. |
| 2006/0230429 A1 | 10/2006 | Van Horck et al. |
| 2006/0268791 A1 | 11/2006 | Cheng et al. |
| 2007/0286224 A1 | 12/2007 | Chen et al. |
| 2008/0229366 A1 * | 9/2008 | Musschebroeck et al. ..... 725/59 |
| 2009/0059815 A1 | 3/2009 | Cheng et al. |
| 2009/0199258 A1 | 8/2009 | Deng et al. |
| 2010/0058391 A1 | 3/2010 | Cooper et al. |
| 2010/0232318 A1 | 9/2010 | Sarkar |
| 2012/0102528 A1 * | 4/2012 | Kim .................. H04N 21/4826 725/46 |
| 2012/0206464 A1 * | 8/2012 | Kim .................. H04N 21/4227 345/520 |
| 2012/0210239 A1 * | 8/2012 | Kim .................. H04N 21/4788 715/738 |
| 2012/0210355 A1 * | 8/2012 | Kim .................. H04N 21/4622 725/38 |
| 2012/0210370 A1 * | 8/2012 | Kim .................. H04N 21/4788 725/61 |
| 2012/0210386 A1 * | 8/2012 | Kim .................. H04N 21/4788 725/148 |
| 2015/0189383 A1 * | 7/2015 | Saijo .................. H04N 21/4668 725/14 |

* cited by examiner

USER ASSIGNED CHANNEL NUMBERING FOR CONTENT FROM MULTIPLE INPUT SOURCE TYPES

FIELD OF THE INVENTION

The application relates generally to user channel numbering for content from multiple input source types.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem that is pertinent here is an entertainment ecosystem in the home that includes a primary display, potentially controlled by a controller such as a personal computer (PC) or a game console, which receives signals from a portable control device such as a tablet computer to playback recorded AV content.

As understood herein, channels have been assigned to input sources such as TV stations and video on demand applications, and so on at the broadcasting end. Among disparate input sources, present principles recognize that the user typically must navigate between separate program guides listing TV channels, website listings or thumbnails, video disk tables of content. This is inconvenient because a user must navigate from UI to UI to select from what might be a relatively small number of favorite input sources.

Present principles thus are directed to allowing the end user to define and organize the channels on a list by placing his important content on the channels he wants. This allows the user to conveniently use channel up and down commands to quickly scroll through all of his favorite content whether it is from a website, a broadcast channel, recorded content, audio streams, photo slideshows, or applications resident on his computer.

Accordingly, a computer device includes at least one computer readable storage medium bearing instructions executable by a processor, and at least one processor configured for accessing the computer readable storage medium to execute the instructions to configure the processor for presenting a user interface (UI) on a display enabling a user to assign a channel number to an input source. The instructions also configure the processor for receiving user input indicating a channel number to assign to the input source and for correlating the channel number to the input source in a data structure of channel numbers and input sources to enable a user to use channel up and channel down commands on a device controlling the display to scroll through the input sources by channel number.

The input source may be a TV station having a TV channel number different than the channel number assigned by the user. The input source may alternatively be an Internet audio and/or video site, a video disk player, a software application on a data storage device, or a photo album stored on a data storage device.

The data structure of channel numbers and input sources may correlate to at least one TV station having a TV channel number to a first user-defined channel number different from the TV channel number. The same data structure may also correlate to at least one Internet source to a second user-defined channel number, to at least one software application to a third user-defined channel number, and to at least recorded content to a fourth user-defined channel number.

In another aspect, a method includes, in an audio video device (AVD) having a TV station-to-channel number mapping, receiving a user selection of plural favorite AV sources. The method includes establishing a favorite channel mapping based at least in part on the user selection of plural favorite sources, and responsive to subsequent channel up and down commands, presenting content on the AVD according to the favorite channel mapping and not the TV station-to-channel number mapping.

In another aspect, an audio video device (AVD) includes at least one computer readable storage medium bearing instructions executable by a processor, and at least one processor configured for accessing the computer readable storage medium to execute the instructions to configure the processor for receiving user selections of first and second favorite AV sources. The instructions when executed by the processor configure the processor for, responsive to receiving the user selections, assigning a first channel number to the first favorite AV source and assigning a second channel number to the second AV source, with the first channel number being one less than the second channel number, to establish a favorite channel mapping based at least in part on the user selection of plural favorite sources. Also, the instructions when executed by the processor configure the processor for, responsive to subsequent channel up and down commands, presenting content on a display according to the favorite channel mapping.

The details of the present invention, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony PlayStation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV with a TV tuner. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
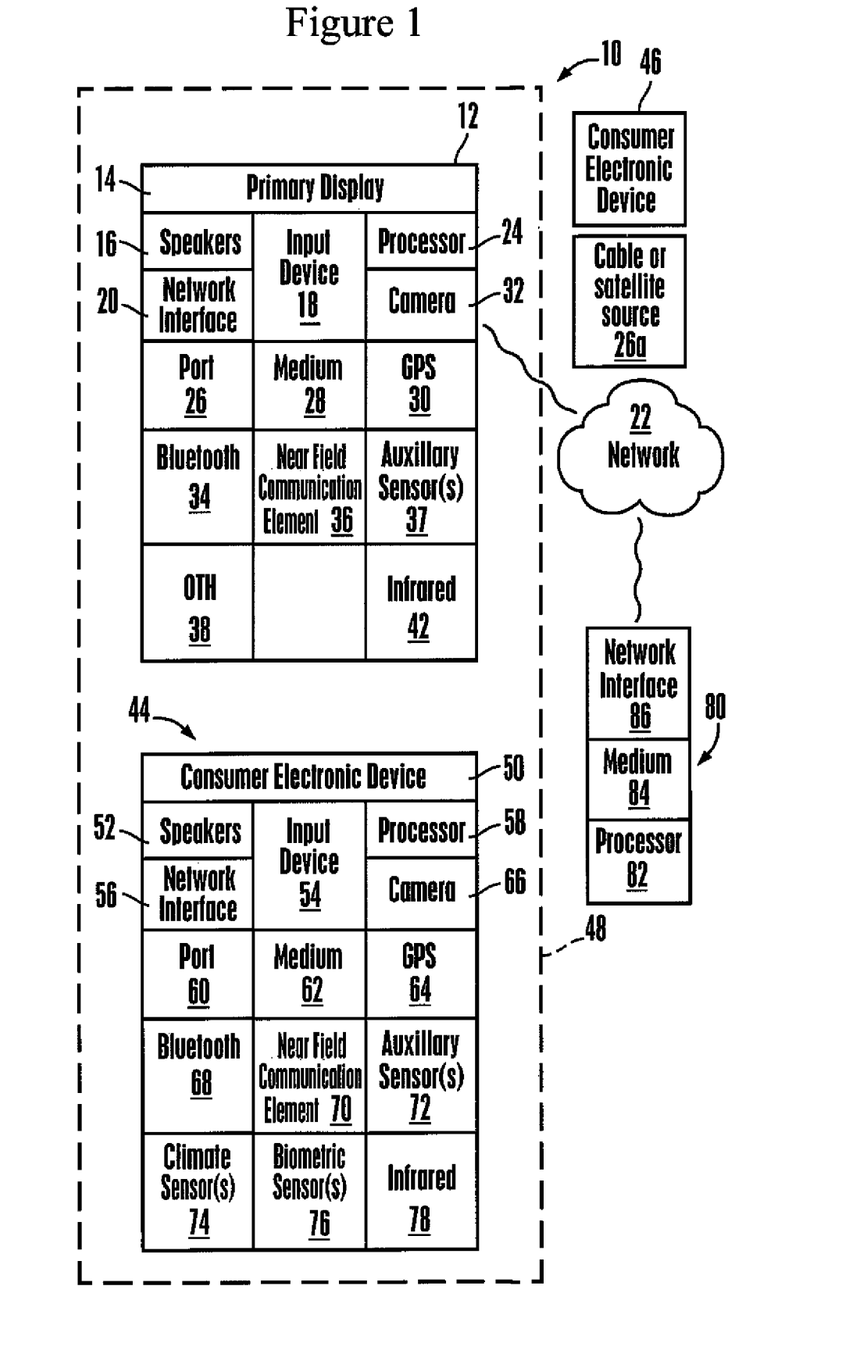
FIG. 1 is a block diagram of an example system including an example in accordance with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a set top box, or a satellite receiver. Or, the source 26a may be a game console or disk player containing content that might be regarded by a user as a favorite for channel assignation purposes described further below.

The AVDD 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
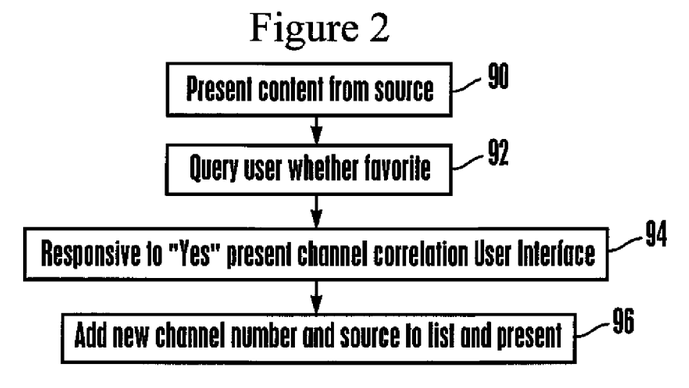
FIG. 2 is a flow chart of example logic.
Figure 3A:
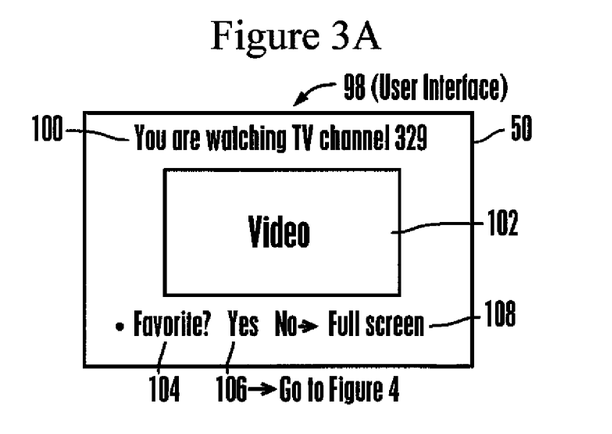
FIGS. 3A-3C are screen shots of example source selection UIs.
Figure 3B:
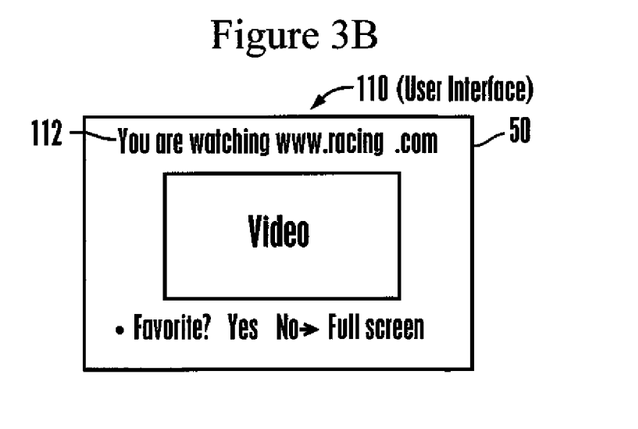
Figure 3C:
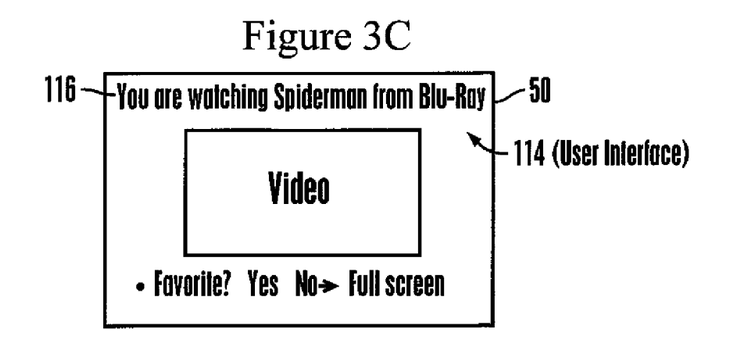

FIG. 2 shows logic and FIGS. 3A-3C and show related example user interfaces (UI) that may be used by a user of the system shown in FIG. 1 and that may be presented by a device such as the CE device 44 that can control AVDDs including TVs, in which case the CE device 44 may be implemented by a cable set top box, a connected internet TV box, a tablet computer, a mobile phone, a media computer, etc.

The UIs allow a user to assign channel numbers to favorite sources of content including over the air broadcast channels, TV input devices such as disk players or PVRs, internet content streams from, e.g., an Internet server such as the server 80, hypertext markup language (html) 5 websites hosted by, e.g., an Internet server such as the server 80, and applications that may be resident on, e.g., the local AVDD storage 28. In this way, the user experience is simplified by combining all of the different content streams regardless of type of source from whence they came into a single natural channel changing interface.

In the example shown, a content source can be correlated to a channel number by making the content source a bookmark or favorite and assign a channel number to it.

Preferably, once established as described above, channels maintain the last state. For example, for a channel representing a web page or html content stream, the processor executing the logic stores the application state and/or video progress state in the case of recorded content for that channel. As discussed further below, the processor when presenting a channel also presents channel state information so that channels can be changed quickly (e.g., in less than two seconds). If the user pauses channel, the channels should load as quickly as possible to maintain a positive user experience.

The logic of FIG. 2 progresses under the direction of the processor 58 executing instructions and begins at block 90, wherein content from a source, e.g. AV content associated with a TV channel 329, may be presented on the display 50 of the CE device 44. A query can be presented to the user on the same display 50 concurrently with the AV content from channel 329 at block 92. The query presented at block 92 may ask the user of the CE device 40 whether the source, which in this example is channel 329, is a favorite.

An affirmative response to the query by the user results in the presentation of a channel correlation UI at block 94. The user may navigate the UI and add a new channel number correlated to channel 329 to a list of preset channels and subsequently present the AV content from channel 329, as in block 96. The content source channel 329 can be correlated to channel number by making the content source a bookmark or favorite and assign a channel number to it. The content stream 329 may be added to a single natural channel changing interface as demonstrated by the logic of FIG. 2, thereby simplifying the user's experience.

It is to be understood that when a user-established favorite source-to-channel number mapping is established as disclosed herein, the processor of the AVDD subsequently accesses that mapping responsive to channel number input commands and channel up/down commands from, e.g., a remote control, instead of accessing the native channel mapping (typically, a TV station-to-channel mapping) that may be resident in the AVDD pursuant to, e.g., TV station discovery principles on initial power-up, or that may be provided by a cable or satellite provider.

Moving in reference to FIG. 3, three examples of the query UI described at block 92 of FIG. 2 are shown. Continuing with the example of channel 329 from FIG. 2, FIG. 3A illustrates a query UI 98 presented on display 50 of the CE device 44 that can include a title text element 100 as a descriptor of the content source. The processor 58 may execute instructions and present the query UI 98 in response to one or plural conditions being met, such as user input to view query UI 98 or a lack of previous input by the user in response to prior presentations of query UI 98. The title text element 100 in this embodiment reads, "You are watching TV channel 329." The AV content can be presented below the title 100 in a smaller video display window 102 in a manner similar to picture-in-picture (PIP) principles.

The query UI 98 may present a query text element 104 below the video window 102 that questions the user whether the current content source described in in title 100 and whose AV content is presented in window 102 is a favorite. The user may manipulate an affirmative selector element 106 if the content source is a favorite. According to logic of FIG. 2, the affirmation that channel 329 is a favorite via manipulation of "yes" selector element 106 can result in presentation of a separate channel correlation UI, which is later described in FIG. 4. Alternatively, the user may determine that the current content source, channel 329, is not a favorite and may thereby manipulate a negative selector element 108. In response to manipulation of "No" selector element 108, the processor 58 can execute instructions to discontinue presentation of UI 98 and present the AV content from source channel 329 in full screen mode rather than in video window 102.

FIG. 3B illustrates a second example of a query UI 110 presented on display 50 and includes a title text element 112 that reads, "You are watching www.racing.com." The same principles and logic described in FIG. 3A apply to this UI 110, the difference between the two being the type of content source. Regardless of type of content source, a query UI may be presented to the user to determine whether the current source is a favorite and whether the user would like to add that source to a simplified channel list correlated to various sources.

FIG. 3C illustrates yet another example of type of content source and includes a query UI 114 presented on display 50 with title text element 116 that reads, "You are watching Spiderman from Blu-Ray." The same principles and logic described above in FIG. 3A may apply to those associated with the content source of a Blu-Ray player.

Figure 4:
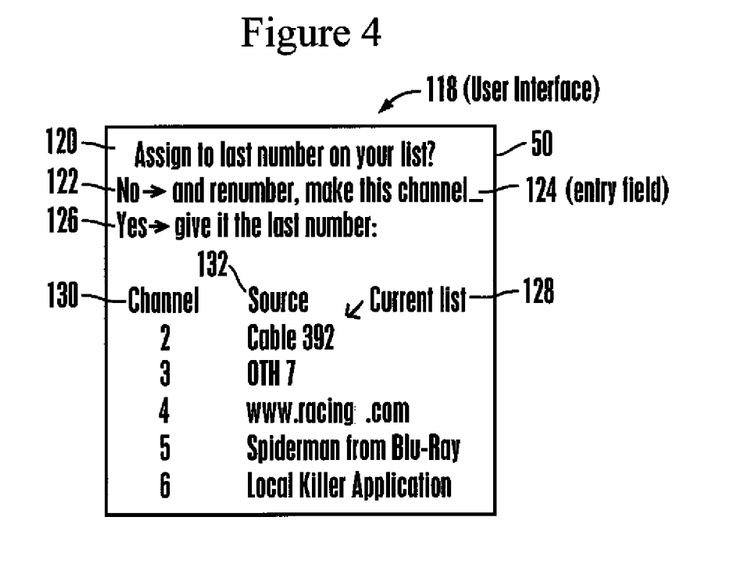
FIG. 4 is a screen shot of an example channel selection UI.

A channel correlation UI 118 may be presented on display 50 in response to manipulation of affirmative selector element 106 and is illustrated in FIG. 4. The channel correlation UI 118 can include a query text element 120 that asks the user whether the content source under consideration may be assigned to the last number on a current list of channels 128.

The user may manipulate a "No" selector element 122 and may assign the content source to a channel number other than the last number on the current channel list 128 by entering a channel number into an entry field 124 associated with selector element 122. The content sources on the current channel list 128 may be renumbered according to user preference. Alternatively, a "Yes" selector element 136 may be manipulated by the user and the current content source may be added to the current channel list 128.

The current channel list 128 included in UI 118 can contain a channel column 130 and a content source column 132. Manipulation of "Yes" selector element 136 may result in the addition of the content source under consideration to be added to the bottom of source column 132 and assigned a channel number in channel column 130 immediately sequentially following (i.e., one integer greater than) the channel number in the row directly above. Thus, the sequence, by channel numbers that increase by one from the immediately preceding favorite channel number, of the user's favorites can be established by the end user such that moving from favorite to favorite is facilitated by single "channel up" and "channel down" commands, e.g., by pressing channel up and down keys on a remote control.

In some embodiments, a user can specify as a favorite a particular show in a channel without making the entire channel a favorite. Only the show is assigned a channel number and when it becomes available as indicated by, e.g., an electronic program guide, the user may be notified and/or the show may appear on an onscreen listing of the favorite channel numbers automatically, with the show greyed out or not listed at all during periods it is not being aired. This can be done using a season pass on a DVR, or a network stream subscription like an RSS feed or in an application exposed through a notification API. In any case, the channel appears on the favorite channel listing only when new content is available.

Also, if desired, knowing a user may be annoyed if he must wait for an application or stream to load or it starts from the top of the experience, content may be presented during the load period.

While the particular USER CHANNEL NUMBERING FOR CONTENT FROM MULTIPLE INPUT SOURCE TYPES is herein shown and described in detail, it is to be understood that the subject matter which is encompassed by the present invention is limited only by the claims.

What is claimed is:

1. A computer device comprising:
   at least one computer memory that is not a transitory signal and that comprises instructions executable by at least one processor for:
   presenting a first user interface (UI) on a display enabling a user to assign a channel number to an input source, the first UI including a current video pane showing a currently viewed video from an input source;
   receiving a selection of a first selector on the first UI indicating that the currently viewed video is a favorite;
   responsive to selection of the first selector, presenting a second UI enabling assignment of a channel number to the input source;
   correlating the channel number to the input source in a data structure of channel numbers and input sources to enable a user to use channel up and channel down commands on a device controlling the display to scroll through the input sources by channel number;
   responsive to selection of a second selector in the first UI indicating the currently viewed video is not a favorite, presenting the currently viewed video in full screen mode.

2. The device of claim 1, wherein the input source is a TV station having a TV channel number different than the channel number assigned by the user.

3. The device of claim 1, herein the input source is an Internet audio and/or video site.

4. The device of claim 1, wherein the input source is a video disk player.

5. The device of claim 1, wherein the instructions are executable for presenting the first UI responsive to receiving input that an input source, is a user favorite.

6. The device of claim 1, wherein the input source is a photo album stored on a data storage device.

7. The device of claim 1, wherein the data structure of channel numbers and input sources correlates:
   at least one TV station having a TV channel number to a first user-defined channel number different from the TV channel number;
   at least one Internet source to a second user-defined channel number; and
   at least one software application to a third user-defined channel number.

8. The device of claim 7, wherein the data structure of channel numbers and input sources correlates:
   at least recorded content to a fourth user-defined channel number.

9. Method comprising:
   in an audio video device (AVD) having a TV station-to-channel number mapping, presenting a first user interface (UI) on a display, the first UI including a current video pane showing a currently viewed video from an input source;
   responsive to receiving a selection of a first selector on the first UI indicating that the currently viewed video is a favorite, presenting a second UI enabling a user to assign a channel number to the input source, the second UI including a first selector selectable to allow user entry of a channel number correlated to the input source by direct input of the channel number, the second UI also including a second selector selectable to cause a channel number on a current channel list to automatically be assigned to the input source without direct input of the channel number;

receiving user input via the second UI indicating a channel number to assign to the input source; and establishing a favorite channel mapping based at least in part on the user input.

10. The method of claim 9, composing;

correlating the channel number to the input source in the favorite channel mapping to enable a user to use channel up and channel down commands on a device controlling the display to scroll through the input sources by channel number.

11. The method of claim 10, wherein the input source is a TV station having a TV channel number different than the channel number assigned by the user.

12. The method of claim 10, comprising presenting the first UI responsive to receiving input that an input source is a user favorite.

13. The method of claim 10, wherein the input source is a video disk player.

14. The method of claim 10, wherein the input source is a software application on a data storage device.

15. The method of claim 10, wherein the input source is a photo album stored on a data storage device.

16. The method of claim 10, wherein the data structure of channel numbers and input sources correlates;

at least one TV station having a TV channel number to a first user-defined channel number different from the TV channel number;

at least one Internet source to a second user-defined channel number; and at least one software application to a third user-defined channel number.

17. Audio video device (AVD) comprising;

at least one computer readable storage medium comprising instructions executable by a processor;

at least one processor configured for accessing the computer readable storage medium to execute the instructions to configure the processor for:

responsive to receiving input from a first user interface (UI) that an input source is a user favorite, presenting a second user interface (UI) on a display enabling a user to assign a channel number to an input source, receiving use input via the second UI to assign a respective channel number to at least first and second input sources; and responsive to receiving the user input via the second UI to assign the respective channel number, assigning a first channel number to the first input source and assigning a second channel number to the second input source to establish a favorite channel mapping based at least in part on the user selection of plural input sources;

responsive to subsequent channel up and down commands, presenting content on a display according to the favorite channel mapping; and responsive to selection of a second selector on the first UI, presenting currently viewed video in full screen mode.

18. The AVD of claim 17, wherein the AVD has a native channel mapping and the favorite channel mapping is used and the native channel mapping is not used, responsive to establishing the favorite channel mapping.

19. The AVD of claim 17, wherein the instructions when executed by the processor configure the processor for:

presenting as user interface (UI) on a display enabling a user to assign a channel number to an input source;

receiving user input indicating a channel number to assign to the input source; and correlating the channel number to the input source in the favorite channel mapping to enable a user to use channel up and channel down commands on a device controlling the display to scroll through the input sources by channel number.

20. The AVD of claim 17, wherein the second UI includes a first selector selectable to allow user entry of a channel number correlated to the input source by direct input of the channel number, the UI also including a second selector selectable to cause a channel number on a current channel List to automatically be assigned to the input source without direct input of the channel number.

* * * * *